US009215623B1

(12) United States Patent
Oroskar

(10) Patent No.: US 9,215,623 B1
(45) Date of Patent: Dec. 15, 2015

(54) COORDINATION OF CODEC CONSISTENCY ACROSS WIRELESS COVERAGE AREAS

(71) Applicant: Sprint Spectrum L.P., Overland Park, KS (US)

(72) Inventor: Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 247 days.

(21) Appl. No.: 13/852,349

(22) Filed: Mar. 28, 2013

(51) Int. Cl.
*H04W 36/00* (2009.01)

(52) U.S. Cl.
CPC ..................................... *H04W 36/00* (2013.01)

(58) Field of Classification Search
CPC ...... H04W 36/00; H04W 36/14; H04W 36/22
See application file for complete search history.

(56) References Cited

U.S. PATENT DOCUMENTS

| | | | |
|---|---|---|---|
| 6,069,883 A | 5/2000 | Ejzak et al. |
| 6,088,335 A | 7/2000 | I et al. |
| 6,349,208 B1 | 2/2002 | Sexton et al. |
| 6,584,098 B1 | 6/2003 | Dutnall |
| 6,665,538 B1 | 12/2003 | Hunte |
| 6,714,514 B1 | 3/2004 | Espax et al. |
| 6,798,786 B1 | 9/2004 | Lo et al. |
| 7,031,703 B1 | 4/2006 | Graf et al. |
| 7,120,447 B1 | 10/2006 | Chheda et al. |
| 7,200,171 B2 | 4/2007 | Forbes et al. |
| 7,254,121 B2 | 8/2007 | Kim et al. |
| 7,328,027 B1 | 2/2008 | Mangal |
| 7,668,134 B2 | 2/2010 | Hosein et al. |
| 7,688,745 B1 | 3/2010 | Hurtta et al. |
| 7,738,427 B1 | 6/2010 | Yew et al. |
| 7,924,764 B2 | 4/2011 | Moorti et al. |
| 8,107,961 B1 | 1/2012 | Vargantwar et al. |
| 8,160,611 B1 | 4/2012 | Oroskar |
| 8,213,953 B1 | 7/2012 | Mangal |
| 8,254,930 B1 | 8/2012 | Mauer et al. |
| 8,442,012 B1 | 5/2013 | Singh et al. |
| 8,457,069 B1 | 6/2013 | Vargantwar et al. |
| 8,457,633 B1 | 6/2013 | Oroskar |
| 8,483,699 B1 | 7/2013 | Oroskar |

(Continued)

OTHER PUBLICATIONS

Unpublished U.S. Appl. No. 13/860,579, entitled "Coordination of Codec Consistency Based on Cross-Carrier Assignment" filed Apr. 11, 2013 in the name of Siddharth S. Oroskar.

(Continued)

*Primary Examiner* — Vladimir Magloire
*Assistant Examiner* — Shantell L Heiber

(57) ABSTRACT

A method and system is disclosed for coordinating codec consistency across wireless coverage areas. When a new communication session is set up for an access terminal in a given wireless coverage of a wireless communication system, a network device, such as a base station, can determine a coding rate to assign for the new session in a manner that accounts for network capacity variations across the wireless coverage areas. The network device can determine a weighted average of coding rates supported in a given wireless coverage area and in each of one or more neighboring wireless coverage areas. Weighting factors in the weighted average can account for rates of inbound and outbound handoffs from and to the neighboring wireless coverage areas. The network device can then select a coding rate for the new communication session based on the determined weighted average.

20 Claims, 5 Drawing Sheets

(56) References Cited

U.S. PATENT DOCUMENTS

| | | |
|---|---|---|
| 8,644,178 B1 | 2/2014 | Oroskar |
| 2003/0007466 A1 | 1/2003 | Chen |
| 2003/0031200 A1 | 2/2003 | Lehtimaki |
| 2003/0236909 A1 | 12/2003 | Chu |
| 2004/0037312 A1 | 2/2004 | Spear |
| 2004/0043751 A1 | 3/2004 | Amalfitano et al. |
| 2006/0182068 A1 | 8/2006 | Stopler |
| 2006/0280159 A1 | 12/2006 | Bi et al. |
| 2007/0058623 A1 | 3/2007 | Moorti et al. |
| 2008/0130511 A1 | 6/2008 | Koo et al. |
| 2009/0154658 A1 | 6/2009 | Kasper et al. |
| 2009/0209300 A1 | 8/2009 | Furbeck |
| 2012/0020248 A1 | 1/2012 | Granlund et al. |
| 2012/0028642 A1* | 2/2012 | Schliwa-Bertling .......... 455/436 |
| 2012/0224561 A1 | 9/2012 | Fang et al. |
| 2012/0307921 A1 | 12/2012 | Ulmer-Moll et al. |
| 2013/0044617 A1 | 2/2013 | Boixadera et al. |
| 2013/0109387 A1* | 5/2013 | Tinnakornsrisuphap et al. ............................ 455/436 |

OTHER PUBLICATIONS

Unpublished U.S. Appl. No. 13/595,668, entitled "Managing Codec Consistency Across a Communication Session" filed Aug. 27, 2012 in the name of Sachin R. Vargantwar.

Unpublished U.S. Appl. No. 13/595,632, entitled "Maintaining Codec Consistency Across a Communication Session" filed Aug. 27, 2012 in the name of Sachin R. Vargantwar.

Unpublished U.S. Appl. No. 13/626,497, entitled "Managing Codec Consistency Across a Communication Session" filed Sep. 25, 2012 in the name of Siddharth S. Oroskar.

Unpublished U.S. Appl. No. 13/647,536, entitled "Coordination of Codec Assignment and Radio Configuration in Wireless Communications" filed Oct. 9, 2012 in the name of Siddharth S. Oroskar.

Office Action in U.S. Appl. No. 13/595,668 mailed May 19, 2014.

* cited by examiner

COORDINATION OF CODEC CONSISTENCY ACROSS WIRELESS COVERAGE AREAS

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennas in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal (also referred to herein by "AT") communicates via an RF air interface with the BTS antenna of the cell. Consequently, a communication path is established between the AT and the transport network, via the air interface, the BTS, the BSC and the switch or gateway. Functioning collectively to provide wireless (i.e., RF) access to services and transport in the wireless communication system, the BTS, BSC, MSC, and PDSN, comprise (possibly with additional components) what is typically referred as a Radio Access Network (RAN).

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

As an access terminal moves between wireless coverage areas of a wireless communication system, such as between cells or sectors, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor signal strength from various available sectors and notify the BSC when a given sector has a signal strength that is sufficiently higher than the sector in which the AT is currently operating. The BSC may then direct the AT to hand off to that other sector. By convention, an AT is said to handoff from a "source" cell or sector (or other coverage area) to a "target" cell or sector.

In some wireless communication systems or markets, a wireless service provider may implement more than one type of air interface protocol. For example, a carrier may support one or another version of CDMA, such as EIA/TIA/IS-2000 Rel. 0, A, and CDMA 2000 Spread Spectrum Systems Revision E (collectively referred to generally herein as "IS-2000") for both circuit-cellular voice and data traffic, as well as a more exclusively packet-data-oriented protocol such as EIA/TIA/IS-856 Rel. 0, A, or other version thereof (hereafter "IS-856"). Under IS-2000, packet-data communications may be referred to as "1X-RTT" communications, also abbreviated as just "1X." However, since IS-2000 supports both circuit voice and packet data communications, the term 1X (or 1X-RTT) is sometimes used to more generally refer the IS-2000 air interface, without regard to the particular type of communication carried. Packet-data communications under IS-856 are conventionally referred to as "EVDO" communications, also abbreviated as just "DO." Access terminals may be capable of communication with either or both protocols, and may further be capable of handing off between them, in addition to being able to hand off between various configurations of coverage areas.

OVERVIEW

Under IS-2000 (and other versions of CDMA) and IS-856, communications from the wireless communication system (or the "wireless network") to an access terminal are carried on a "forward link" of the air interface, and communications from an access terminal to a base station are carried on a "reverse link" of the air interface. For IS-2000, data sent on both the forward and reverse links are assembled into units called frames, which contain data encoded for transmission to or from the access terminal (and correspondingly, from or to the base station), and are transmitted at regular intervals (corresponding to a frame rate), typically 20 milliseconds in duration (although other transmission intervals can be used). The receiving entity (e.g., access terminal on the forward link, and the wireless network—or a network device therein—on the reverse link) decodes the encoded data in received frames to recover the original data.

Encoding typically involves compression of data from an input bit rate to an output bit rate, where the output bit rate usually requires reduced transmission bandwidth (or data storage space) compared with the input bit rate. The amount of compression achieved depends on the compression scheme or algorithm applied, including whether or not any information in the input data is lost or modified in the process (e.g., rendered in some form of analytic approximation in order to accommodate reduced "volume"). The decoding process essentially reverses the encoding process, including decompressing the compressed data. The fidelity of the recovered data to the original data depends, in part, on how well the compression-decompression scheme compensates for lost or modified information, as well as the ability of the scheme to correct for degradation due to imperfect transmission (e.g., errors, noise, etc.).

The implementation of an encoding-decoding algorithm is referred to as a "codec" (for coder/decoder), and usually takes the form of a device (e.g., a digital signal processor, or the like) and/or computer-executable instructions (e.g., software, firmware, etc.). Different codecs may implement different encoding-decoding schemes, including the ability to achieve different levels of compression and/or different degrees of protection against transmission errors, and a given codec may have different modes of operation that similarly accommodate different levels of compression and/or different degrees of protection against transmission errors. Codecs typically comply with one or another industry standard in order to help insure interoperability.

For example, CDMA 2000 Spread Spectrum Systems (also referred to as CDMA2000 1X) and CDMA 2000 Spread Spectrum Systems Revision E (also referred to as CDMA2000 1X Advanced) specify support for a family of codecs referred to under the umbrella of "Enhanced Variable Bitrate Codec," or "EVRC." More particularly, "EVRC-B"

(and upgrade to EVRC) is a speech codec that defines eight levels of average data rates that may be selected for encoding on a forward link to, and/or a reverse link from, an access terminal engaging in a voice call. Generally, a higher the data rate requires higher transmission power, but provides the better the voice quality, and vice versa. The eight levels are referred to as "capacity operating points" or "COPs," and are labeled with parameter values 0 through 7, in order from highest to lowest average data rate. When a given call is set up, the RAN (or RAN element, such as a BSC) selects a COP value based on capacity utilization of the sector in which the access terminal is operating. The COP value may also be adjusted by the RAN as the access terminal moves between sectors that have differing capacity loading conditions.

While a low COP value (e.g., 0) can provide high voice quality during a portion of a voice call when capacity utilization supports higher average data rates, it may also be the case that a changing COP value in correspondence with changing capacity utilization in different cells or sectors visited by an AT during a call can result in changing voice quality that a user finds distracting or annoying. A conventional approach to addressing the change in voice quality due to changing COP values is to simply fix a COP value for the duration of a call, without regard to network loading conditions in the different cells or sectors. However, this may have a negative impact on network operations, especially if network load is high in any of the cells or sectors. Consequently, conventional assignment of COP values can result in inefficient, and potentially wasteful, use of transmission capacity on forward and/or reverse links with access terminals in a wireless communication system.

The principles that apply to voice calls can also apply more generally to communication sessions for carrying voice and/or other forms of data. Accordingly, it would be desirable to be able to maintain consistency of codecs across different cells or sectors of a call or communication session in a manner that accounts for operating conditions (e.g., capacity loading) in neighboring cells or sectors. By doing so, allocation of transmission capacity on forward and/or reverse links can be more effectively and efficiently balanced against available capacity in the system as a whole.

Hence in one respect, various embodiments of the present invention provide, in a radio access network (RAN) device of a wireless communication system, a method comprising: determining a rate of inbound handoffs of active communication sessions to a given wireless coverage zone from each of one or more neighboring wireless coverage zones, wherein the active communication sessions are carried for respective time intervals on one or more air interface between respective access terminals and at least the given wireless coverage zone; determining a respective rate of outbound handoffs of active communication sessions from the given wireless coverage zone to each of the one or more neighboring wireless coverage zones; based on the determined rate of inbound handoffs and on the determined respective rates of outbound handoffs, determining a weighted average of transmission rates supported by an air interface of the given wireless coverage zone and respective air interfaces of the one or more neighboring wireless coverage zones; upon receiving a request from an access terminal to set up a new communication session via the air interface of the given wireless coverage zone, determining a coding rate for the new communication session based on the determined weighted average of transmission rates; and transmitting an instruction to the access terminal to use the determined coding rate for air-interface communications for a duration of the new communication session.

In another respect, various embodiments of the present invention provide, a radio access network (RAN) device of a wireless communication system comprising: one or more processors; memory accessible by the one or more processors; and computer-readable instructions stored in the memory that upon execution by the one or more processors cause the RAN device to carry out functions including: determining a rate of inbound handoffs of active communication sessions to a given wireless coverage zone from each of one or more neighboring wireless coverage zones, wherein the active communication sessions are carried for respective time intervals on one or more air interface between respective access terminals and at least the given wireless coverage zone, determining a respective rate of outbound handoffs of active communication sessions from the given wireless coverage zone to each of the one or more neighboring wireless coverage zones; based on the determined rate of inbound handoffs and on the determined respective rates of outbound handoffs, determining a weighted average of transmission rates supported by an air interface of the given wireless coverage zone and respective air interfaces of the one or more neighboring wireless coverage zones, upon receiving a request from an access terminal to set up a new communication session via the air interface of the given wireless coverage zone, determining a coding rate for the new communication session based on the determined weighted average of transmission rates, and transmitting an instruction to the access terminal to use the determined coding rate for air-interface communications for a duration of the new communication session.

In yet another respect, various embodiments of the present invention provide, a non-transitory computer-readable medium having instructions stored thereon that, upon execution by one or more processors of a radio access network (RAN) device of a wireless communication network, cause the RAN device to carry out functions including: determining a rate of inbound handoffs of active communication sessions to a given wireless coverage zone from each of one or more neighboring wireless coverage zones, wherein the active communication sessions are carried for respective time intervals on one or more air interface between respective access terminals and at least the given wireless coverage zone; determining a respective rate of outbound handoffs of active communication sessions from the given wireless coverage zone to each of the one or more neighboring wireless coverage zones; based on the determined rate of inbound handoffs and on the determined respective rates of outbound handoffs, determining a weighted average of transmission rates supported by an air interface of the given wireless coverage zone and respective air interfaces of the one or more neighboring wireless coverage zones; upon receiving a request from an access terminal to set up a new communication session via the air interface of the given wireless coverage zone, determining a coding rate for the new communication session based on the determined weighted average of transmission rates; and transmitting an instruction to the access terminal to use the determined coding rate for air-interface communications for a duration of the new communication session.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

Example embodiments will be described by way of example with reference to Code Division Multiple Access ("CDMA") communications in general, and to IS-856 and IS-2000 (including CDMA2000 1X and CDMA2000 1X Advanced) communications in particular. As described below, IS-2000 applies to both circuit-cellular and packet-data communications, and is referred to herein as "conventional" CDMA communications. For voice communications, CDMA2000 1X and/or CDMA2000 1X Advanced may specify codec support according to EVRC, including EVRC-B, EVRC-WB, and EVRC-NW. IS-856 applies more exclusively to packet-data communications (including, e.g., real-time voice and data applications), and is referred to herein as "high rate" packet-data communications. It should be understood that example embodiments can apply to other wireless voice and data protocols including, without limitation, IS-95 and GSM, which, together with IS-856 and IS-2000 are considered herein, individually or in combination, to comprise a CDMA family of protocols.

Figure 1:
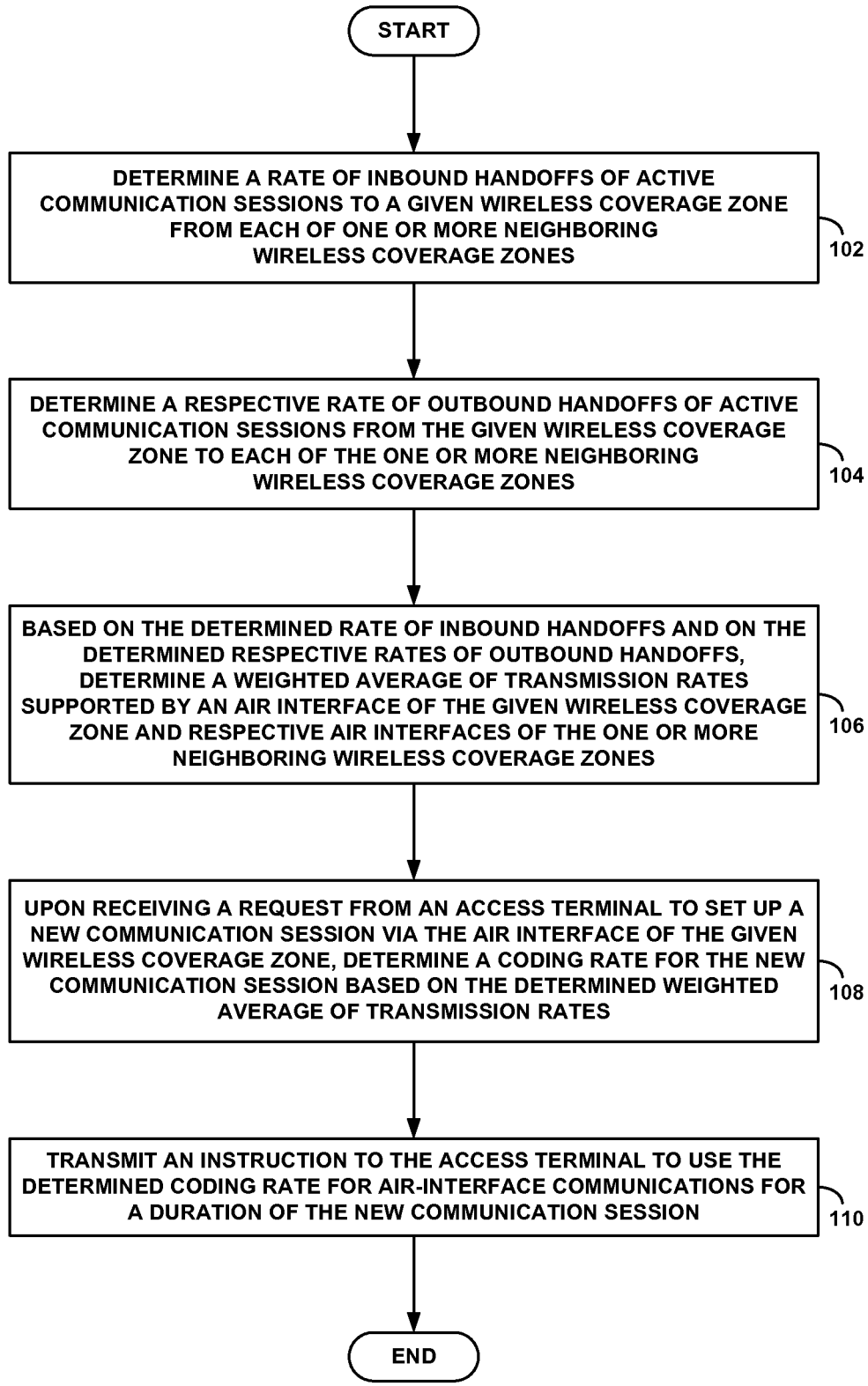
FIG. 1 is a flowchart illustrating an example method of coordination codec consistency across wireless coverage areas, in accordance with an example embodiment.

FIG. 1 is a flowchart illustrating an example method of coordination codec consistency across wireless coverage areas, in accordance with a first embodiment. By way of example, the method could be carried out by a RAN device configured to operate according to a CDMA family of protocols, including at least CDMA2000 1X. The RAN device could be, for example, a base station, a BSC, or an MSC operating in a wireless communication system (or wireless communication network) that is also configured to operate according to a CDMA family of protocols.

At step 102, the RAN device determines a rate of inbound handoffs of active communication sessions to a given wireless coverage zone from each of one or more neighboring wireless coverage zones. In accordance with example embodiments, an inbound handoff, also referred to as a "hand-in," is a handoff of an active communication session into the given wireless coverage zone from a neighboring wireless coverage zone. Examples of a RAN device include a base station, a base transceiver station (BTS), a base station controller (BSC), and a radio network controller (RNC). Examples of wireless coverage zones include cells and sectors of a wireless communication system. The general term "wireless coverage area" is also used herein interchangeably with "wireless coverage zone." A neighboring wireless coverage zone of the given wireless coverage zone is one that may border or overlap with the given wireless coverage zone, or otherwise be within a proximity such that handoffs between the given wireless coverage zone and the neighboring wireless coverage zone can be achieved. With this description, the given wireless coverage zone could be a particular wireless sector of the wireless communication system and each of the one or more neighboring wireless coverage zones could be a respective wireless sector of the wireless communication network.

An active communication session in a wireless coverage zone is a communication session, such as a voice call, terminated at a "near end" by an access terminal, and communicatively connected with the RAN by way of an air interface between the access terminal and a RF access device (e.g., base station) of the wireless communication zone. The active communication session could be terminated at a "far end" by another access terminal or other type of used client device, or by a server or other type of computer device. In reference to the near end, and to handoffs (and rates thereof) to (or from) a given wireless coverage zone from (or to) neighboring wireless coverage zones, active communication sessions may be said to be carried for respective time intervals on one or more air interface between respective access terminals and at least the given wireless coverage zone. The respective time intervals may refer to different durations of communication sessions for different access terminals and/or different durations of air interface communications between an access terminal (or access terminals) and one or more wireless coverage zones. It will be appreciated that there could be segments or "legs" of a communication session that traverse (e.g. are carried by) communicative links other than an air interface.

At step 104, the RAN device determines a respective rate of outbound handoffs of active communication sessions from the given wireless coverage zone to each of the one or more neighboring wireless coverage zones. In accordance with example embodiments, an outbound handoff, also referred to as a "hand-out," is a handoff of an active communication session from the given wireless coverage zone to a neighboring wireless coverage zone.

At step 106, the RAN device determines a weighted average of transmission rates supported by an air interface of the given wireless coverage zone and respective air interfaces of the one or more neighboring wireless coverage zones, based on the determined rate of inbound handoffs and on the determined respective rates of outbound handoffs. As described below, the determined rate of inbound handoffs may be used as weighting factor for transmission rates supported by the air interface of the given wireless coverage zone. Similarly, the determined rate of outbound handoffs to each respective neighboring wireless coverage zone may be used as a respective weighting factor for transmission rates supported by the respective neighboring wireless coverage zone.

At step 108, upon receiving a request from an access terminal to set up a new communication session via the air interface of the given wireless coverage zone, the RAN device determines a coding rate for the new communication session based on the determined weighted average of transmission rates.

Finally, at step 110, the RAN device transmits an instruction to the access terminal to use the selected coding rate for air-interface communications for a duration of the new communication session. More specifically, the access terminal may transmit and receive on the air interfaces with the given wireless coverage zone and one or more other wireless coverage zones at data rates determined, at least in part, by a selectable coding rate. For a given call or communication session, such as the new communication session, the coding rate may thus be selected by the RAN device, based on based on the determined weighted average of transmission rates. The access terminal's coding rate for the new communication session may then be set via a command or instruction from the base station (or other RAN device).

In accordance with example embodiments, determining the weighted average of transmission rates at step 106 could include weighting a transmission rate supported by the air interface of the given wireless coverage zone by the determined rate of inbound handoffs, and weighting a transmission rate supported by an air interface of each respective neighboring wireless coverage zone of the one or more neighboring wireless coverage zones by the respective rate of outbound handoffs to the respective neighboring wireless coverage zone. Furthermore, the transmission rate supported by the air interface of the given wireless coverage zone could be determined based on a quality level of RF operating conditions in the given wireless coverage zone, such as noise and interference and/or capacity loading. Similarly, the transmission rate supported by the air interface of each respective neighboring wireless coverage zone of the one or more neighboring wireless coverage zones could also be determined based on the quality level of RF operating conditions in the respective neighboring wireless coverage zone, such as noise and interference and/or capacity loading.

In further accordance with example embodiments, the example method illustrated in FIG. 1 can be applied to communications in either or both directions between the access terminal and the given wireless coverage zone and/or the one or more neighboring wireless coverage zones. More particularly, determining (at step 106) the weighted average of transmission rates supported by the air interface of the given wireless coverage zone and the respective air interfaces of the one or more neighboring wireless coverage zones could correspond to determining a weighted average of forward-link transmission rates supported on air-interface forward links from the given wireless coverage zone and from the one or more neighboring wireless coverage zones to access terminals. Correspondingly, determining the coding rate for the new communication session at step 108 could correspond to selecting a decoding rate for forward-link communications based on the determined weighted average of forward-link transmission rates. Further, transmitting the instruction to the access terminal to use the determined coding rate for air-interface communications for the duration of the new communication session could correspond to transmitting an instruction to the access terminal to use the selected decoding rate for forward-link communications.

Similar considerations could apply to the reverse link from the access terminal to the given wireless coverage zone and/or to the one or more neighboring wireless coverage zones. More specifically, determining (at step 106) the weighted average of transmission rates supported by the air interface of the given wireless coverage zone and the respective air interfaces of the one or more neighboring wireless coverage zones could correspond to determining a weighted average of reverse-link transmission rates supported on air-interface reverse links to the given wireless coverage zone and to the one or more neighboring wireless coverage zones from access terminals. Again correspondingly, determining the coding rate for the new communication session at step 108 could correspond to selecting an encoding rate for reverse-link communications based on the determined weighted average of reverse-link transmission rates. Transmitting the instruction to the access terminal to use the determined coding rate for air-interface communications for the duration of the new communication session could then correspond to transmitting an instruction to the access terminal to use the selected encoding rate for reverse-link communications.

In accordance with example embodiments, the new communication session may be a voice call, in which case determining (at step 108) the coding rate for the new communication session based on the determined weighted average of transmission rates could correspond to determining a voice codec and encoding/decoding rate that will be used on at least the air interface of the given wireless coverage zone during the voice call.

Also in accordance with example embodiments, transmission rates supported by the air interface of the given wireless coverage zone and by respective air interfaces of the one or more neighboring wireless coverage zones could correspond to coding rates supported by the air interface of the given wireless coverage zone and by respective air interfaces of the one or more neighboring wireless coverage zones. As such, determining (at step 106) the weighted average of transmission rates supported by the air interface of the given wireless coverage zone and the respective air interfaces of the one or more neighboring wireless coverage zones could correspond to determining a weighted average of coding rates supported by the air interface of the given wireless coverage zone and the respective air interfaces of the one or more neighboring wireless coverage zones.

In further accordance with example embodiments, the coding rates supported by the air interface of the given wireless coverage zone and by respective air interfaces of the one or more neighboring wireless coverage zones could each be identified according to a symbolic label, such as a running number, for example. In this case, determining the weighted average of the coding rates supported by the air interface of the given wireless coverage zone and the respective air interfaces of the one or more neighboring wireless coverage zones could correspond to determining a weighted average of symbolic labels.

Determination at step 108 of the coding rate for the new communication session based on the determined weighted average of transmission rates could additionally or alternatively correspond to selecting from among a plurality of predefined coding rates a particular coding rate that most closely corresponds to the determined weighted average of transmission rates.

In accordance with example embodiments in which the wireless communication system is configured to operate according to CDMA2000 1X and/or CDMA2000 1X Advanced with codec support according to EVRC, including at least EVRC-B, air-interface coding rates may be assigned according to predefined Capacity Operating Point (COP) parameter values. In particular, COP-specified codec rates are used for voice calls. Under EVRC-B, COP parameter values may be defined in a range from a minimum COPs value to a maximum COPs value, where each COP parameter value is associated with a different coding rate. Larger COP parameter values are associated with smaller coding rates, and vice versa. For example, eight integer COP parameter values ranging from 0, . . . , 7 may be defined to specify coding rates that yield average data rates ranging from 6.93 kilobits per second (kbps) down to 3.75 kbps. COP parameter values are examples of symbolic labels that identify different coding rates.

In further accordance, then, with example embodiments, the RAN device could select from among the plurality of predefined coding rates the particular coding rate that most closely corresponds to the determined weighted average of transmission rates by selecting a COP parameter value associated with an air-interface coding that most closely corresponds to the determined weighted average of transmission rates. As noted above, the weighted average could be determined as a weighted average of COP values, in which case the selected COP parameter value could be one that most closely corresponds to the weighted average of COP values.

It will be appreciated that the steps of FIG. 1 are presented by way of example, and that additional and/or alternative steps or alternative ordering of steps could be carried out and still remain within the scope and spirit of the embodiments herein.

Figure 2:
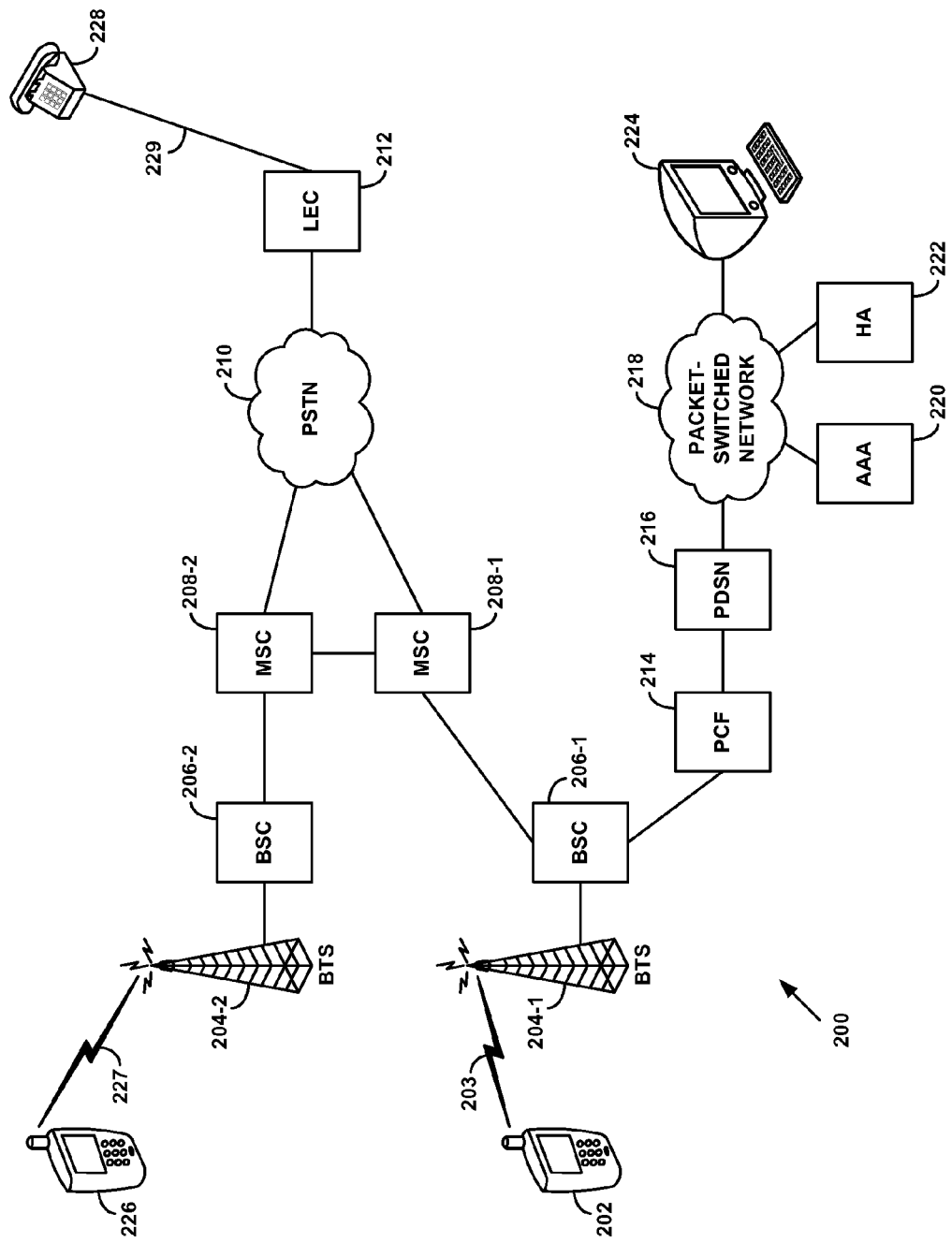
FIG. 2 is a simplified block diagram of a wireless communication system in which example embodiments of coordination codec consistency across wireless coverage areas can be employed.

FIG. 2 shows a simplified block diagram of a wireless communication system 200 in which example embodiments of coordination codec consistency across wireless coverage areas could be employed. By way of example, an access terminal AT 202 communicates over an air interface 203 with a BTS 204-1, which is then coupled or integrated with a BSC 206-1. Transmissions over air interface 203 from BTS 204-1 to AT 202 represent the forward link to the access terminal (also referred to herein alternatively as the forward link from the base station, and as "the AT's forward link"). Transmissions over interface 203 from AT 202 to BTS 204-1 represent the reverse link (also referred to herein as "the AT's reverse link"). It will be appreciated that the arrangement shown in the figure is illustrative.

Also by way of example, a second access terminal AT 226 is depicted as communicating over an air interface 227 with a BTS 204-2, which is coupled or integrated with a BSC 206-2. Transmissions over air interface 227 from BTS 204-2 to AT 226 represent the forward link to the access terminal, and transmissions over interface 227 from AT 226 to BTS 204-2 represent the reverse link.

The BSC 206-1 is connected to MSC 208-1, which acts to control assignment of air traffic channels (e.g., over air interface 203), and provides access to wireless circuit-switched services such as circuit-voice and circuit-data (e.g., modem-based packet data) service. By way of example, the MSC 208-1 is shown as being connected to a second MSC region represented in the figure by the MSC 208-2, the BSC 206-2, and the BTS 204-2. Support for user mobility across MSC regions, as well as communications between AT in different MSC regions, is represented by the connection shown between the MSC 208-1 and 208-2. As represented by their respective connections to PSTN 210, MSCs 208-1 and 208-2 are also coupled with one or more telephony circuit switches, such as the Local Exchange Carrier (LEC) switch 212 in the operator's (or in a different operator's) network. The LEC 212 (or other form of landline switch) may support connectivity to landline subscribers, such as is represented by landline phone 228 connected via the end link 229.

As shown, BSC 206-1 is also connected with a PDSN 216 by way of packet control function (PCF) 214. PDSN 216 in turn provides connectivity with a packet-switched network 218, such as the Internet and/or a wireless carrier's private core packet-network. Sitting as nodes on network 218 are, by way of example, an authentication, authorization, and accounting (AAA) server 220, a mobile-IP home agent (HA) 222, and a remote computer 224. After acquiring an air traffic channel over its air interface, an access terminal (e.g., AT 202) may send a request to PDSN 216 for a connection in the packet data network. Then, following authentication of the access terminal by AAA server 220, the access terminal may be assigned an IP address by the PDSN or by HA 222, and may thereafter engage in packet-data communications with entities such as remote computer 224. Although not necessarily shown explicitly in FIG. 2, the BSC 208-2 may also provide a packet data connection to a packet switch network, such the network 218, for packet-data services.

It should be understood that the depiction of just one (or two) of each network element in FIG. 2 is illustrative, and there could be more than one (or two) of any of them, as well as other types of elements not shown. The particular arrangement shown in FIG. 2 should not be viewed as limiting with respect to the embodiments herein. Further, the network components that make up a wireless communication system such as system 200 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary access terminal 202 typically comprises a user-interface, I/O components, a transceiver, a communication interface, a tone detector, a processing unit, and data storage, all of which may be coupled together by a system bus or other mechanism. As such, system 200, ATs 202 and 226, air interfaces 203 and 227, landline phone 228, and end link 229 are representative of exemplary means of implementing and carrying out the various functions, steps, and procedures described herein.

Figure 3:
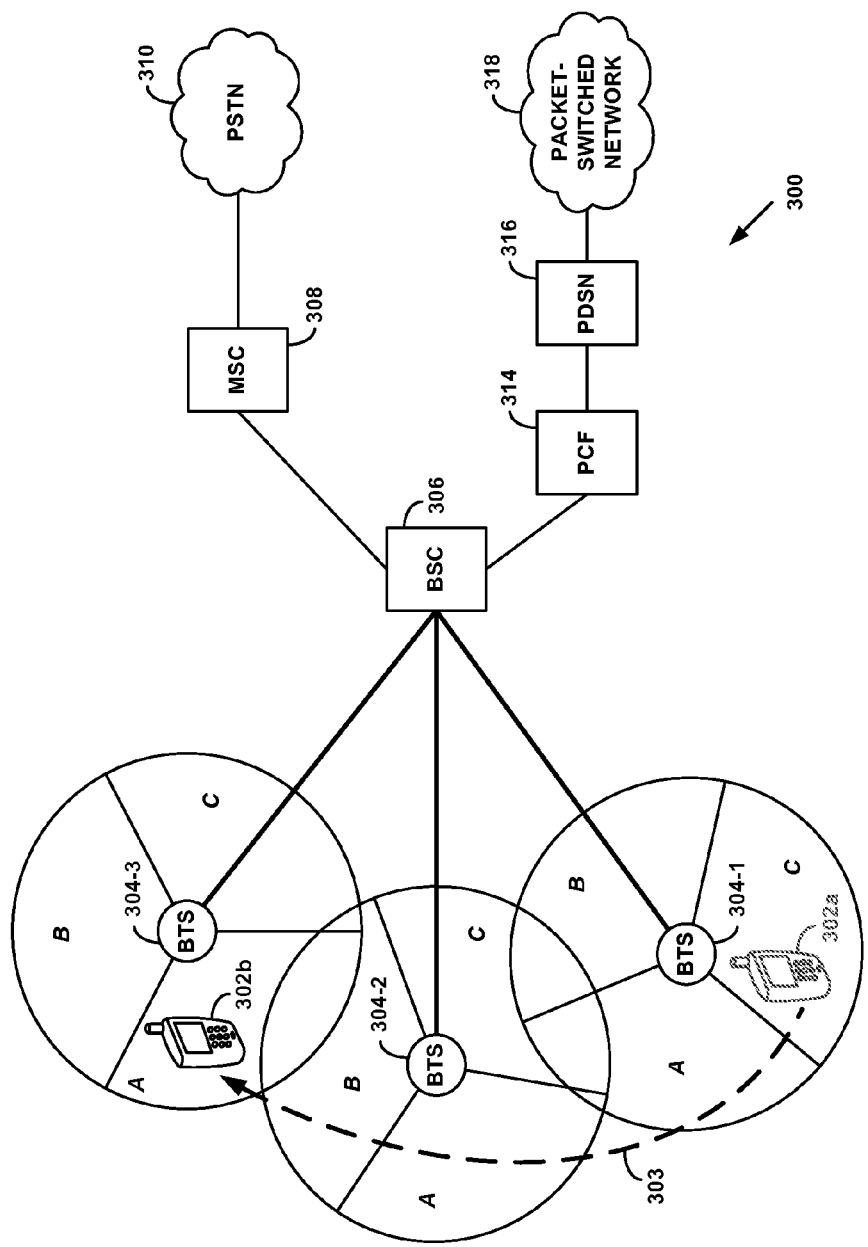
FIG. 3 illustrates an example an access terminal traversing wireless coverage areas in a wireless communication system, in accordance with example embodiments.

In practice, a BSC, such as the BSCs 206-1 and 206-2 may serve multiple BTSs, each of which may then radiate to define a given cell and a plurality of cell sectors. This arrangement is illustrated in FIG. 3, which shows BSC 306 in network 300 coupled with three BTSs 304-1, 304-2, and 304-3. Each BTS is shown at the core of a respective circle representing a cell, and each cell is divided into three pie-pieces, labeled "A," "B," and "C," representing wireless service sectors. With this arrangement, an access terminal can operate in any of the sectors and can connect, via a serving BTS, with a MSC 308 for circuit-based services in the wireless communication system and beyond (e.g., in PSTN 310). For purposes of illustration, an access terminal AT 302 is depicted as traversing along a path 303 from sector C of the BTS 304-1 (where the AT is labeled 302-*a*) to sector A of the BTS 303-4 (where the AT is labeled 302-*b*). The AT 302 may handoff to intervening sectors as it traverses the path 303. Through its serving sector, an access terminal can also communicate, via PCF 314 and PDSN 316, on packet network 318. Note that the depiction of three wireless services sectors for each of the BTSs in FIG. 3 is by way of example, and other numbers of sectors per BTS are possible. Further, the relative positions of the BTSs and the relative angular orientations of the wireless service sectors are also illustrative, and other arrangements may be used.

Throughout this description, the term "base station" will be used to refer to a Radio Access Network (RAN) element or RAN device such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group.

The term controlling RNC (or C-RNC) customarily applies to the RNC that carries out these (and possibly other) control functions.

1. CONVENTIONAL CDMA COMMUNICATIONS

In a conventional CDMA wireless network compliant with the well known IS-2000 standard, each cell employs one or more carrier frequencies, typically 1.25 MHz in bandwidth each, and each wireless service sector is distinguished from adjacent sectors by a pseudo-random number offset ("PN offset"). Further, each sector can concurrently communicate on multiple different channels, distinguished from each other by "Walsh codes." When an access terminal operates in a given sector, communications between the access terminal and the BTS of the sector are carried on a given frequency and are encoded by the sector's PN offset and a given Walsh code.

Air interface communications are divided into forward link communications, which are those passing from the base station to the access terminal, and reverse link communications, which are those passing from the access terminal to the base station. In an IS-2000 system, data are transmitted in units of frames on both the forward link and reverse link. On either link, communications in a given wireless service sector are encoded with the sector's PN offset and a given Walsh code. On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

In order to facilitate efficient and reliable handoff of access terminals between sectors, under IS-2000 an AT can communicate on a given carrier frequency with a number of "active" sectors concurrently, which collectively make up the AT's "active set." Depending on the system, the number of active sectors can be up to six (currently). The access terminal receives largely the same signal from each of its active sectors and, on a frame-by-frame basis, selects the best signal to use. An AT's active set is maintained in the access terminal's memory, each active sector being identified according to its PN offset. The AT continually monitors the pilot signals from its active sectors as well as from other sectors, which may vary in as the AT moves about within the wireless communication system, or as other factors cause the AT's RF conditions to change. The AT reports the received signal strengths to the serving base station, which then directs the AT to update its active set in accordance with the reported strengths and one or more threshold conditions.

In order to support concurrent communication in multiple channels on a common frequency, each channel is allocated a fraction of the total forward-link power available in the sector. The power allocated to each channel is determined so as to optimize the signal-to-noise characteristics of all the channels, and may vary with time according to the number of access terminals being serviced, and their relative positions with respect to the BTS, among other factors. Similarly, on the reverse links, each access terminal transmits at a power level that optimizes the signal-to-noise while minimizing interference with other access terminals. With arrangement described above, an access terminal can engage in cellular voice or packet-data communications. Referring again to FIG. 2, and taking an originating call from AT 202 as an example, AT 202 first sends an origination request over air interface 203 and via the BTS 204-1 and BSC 206-1 to MSC 208-1. The MSC then signals back to the BSC directing the BSC to assign an air interface traffic channel for use by the access terminal. For a voice call, the MSC uses well-known circuit protocols to signal call setup and establish a circuit connection to a destination switch that can then connect the call to a called device (e.g., landline phone or another access terminal).

For a packet-data session, the BSC 206-1 signals to the PDSN 216 by way of PCF 214. The PDSN 216 and access terminal 202 then negotiate to establish a data link layer connection, such as a point to point protocol (PPP) session. Further, the PDSN 216 sends a foreign agent advertisement that includes a challenge value to the access terminal, and the access terminal responds with a mobile-IP registration request (MIP RRQ), including a response to the challenge, which the PDSN forwards to HA 222. The HA then assigns an IP address for the access terminal to use, and the PDSN passes that IP address via the BSC to the access terminal.

2. HIGH RATE PACKET-DATA COMMUNICATIONS

Under IS-2000, the highest rate of packet-data communications theoretically available on a fundamental traffic channel of the forward link is 9.6 kbps, dependent in part on the power allocated to the forward-link traffic channel and the resultant signal-to-noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, each access terminal maintains and manages an active set as described above, but receives forward-link transmission from only one active sector at a time. In turn, each sector transmits to all its active ATs on a common forward link using time division multiplexing (TDM) in order to transmit to only one access terminal at a time, but at the full power of the sector. As a result of the full-power allocation by the sector, an access terminal operating under IS-856 can, in theory, receive packet-data at a rate of at least 38.4 kbps and up to 2.4 Mbps on its forward link.

The reverse link under IS-856 retains largely the traditional IS-2000 code division multiplexing (CDM) format, albeit with the addition of a "data rate control" (DRC) channel used to indicate the supportable data rate and best serving sector for the forward link. Multiple, active ATs in a common serving sector can transmit concurrently on their respective reverse links to the sector's BTS. Each reverse link comprises distinct code channels, thereby enabling the BTS to distinguish among each AT's transmissions. As with IS-2000, the IS-856 reverse link transmissions are frame-based. Unlike the IS-856 forward link which is allocated the full power of the serving sector (or other coverage area) to each AT on a TDM basis, the power applied to the reverse link from each of possibly multiple ATs in a common serving sector is individually controlled by the base station using the same methods described above for IS-2000.

TDM access on the IS-856 forward link is achieved by dividing the forward link in the time domain into time slots of length 2048 chips each. At a chip rate of 1.228 Mega-chips per second, each slot has a duration of 1.67 milliseconds (ms). Each time slot is further divided into two 1024-chip half-slots, each half-slot arranged to carry a 96-chip pilot "burst" (pilot channel) at its center and a Medium Access Control (MAC) channel in two 64-chip segments, one on each side of the pilot burst. The remaining 1600 chips of each time slot (800 per half-slot) are allocated for a forward traffic channel or a forward control channel, so that any given time slot will carry either traffic-channel data (if any exists) or control-channel data. Traffic-channel data comprise user application data, while control-channel data comprise IS-856 control messages. As in IS-2000, each sector in IS-856 is defined by a PN offset, and the pilot channel carries an indication of the sector's PN offset. Also as in IS-2000, an access terminal operating under IS-856 monitors the pilot signal emitted by various sectors in order to facilitate active set management, i.e., as a basis to facilitate handoff from one sector to another.

Operation in an IS-856 compliant communication system may be illustrated, again with reference to FIG. 2. To acquire packet data connectivity under IS-856, after an access terminal first detects an IS-856 carrier, the access terminal 202 sends to its BSC (or RNC) 206-1 a UATI (Universal Access Terminal Identifier) request, and receives in response an UATI, which the access terminal can then use to identify itself in subsequent communications with the BSC. The access terminal then sends a connection-request to the BSC 206-1, and the BSC responsively invokes a process to authenticate the access terminal and to have the access terminal acquire a data link.

In particular, the BSC 206-1 sends an access request to an Access Network AAA (ANAAA) server (which may be different than the AAA server 220), and the ANAAA server authenticates the access terminal. The BSC 206-1 then assigns radio resources for the data session, providing a MAC identifier ("MAC ID") to the AT for identifying its time-slot data sent in the forward-link traffic channel, and a Walsh code for a sending data on the reverse-link traffic channel. Further, the BSC 206-1 signals to the PDSN 216 (via PCF 214), and the PDSN and access terminal then negotiate to establish a PPP data link. In addition, as in the IS-2000 process, the access terminal then sends an MIP RRQ to the PDSN, which the PDSN forwards to the HA 222, and the HA assigns a mobile-IP address for the access terminal to use.

Once the access terminal has acquired an IS-856 radio link, a data link, and an IP address, the access terminal is considered to be in an active mode. In active mode, the AT receives its data distributed across MAC-identified time slots transmitted by the BTS using the full power of the forward link of the sector selected by the AT (as described above). Thus, the access terminal recognizes its time-slot data from among other time slots by a MAC identifier included in each transmission, and processes only those time slots with the AT's assigned MAC identifier. Using the full power of the forward link maximizes the signal-to-noise ratio, thus facilitating higher rate data communication than the power-limited conventional CDMA channels.

3. COORDINATING CODEC ASSIGNMENT ACROSS WIRELESS COVERAGE AREAS

When a communication session, such as a voice call, is set up with an access terminal operating in a wireless communication system, a forward link from the base station to the access terminal, and a reverse link from the access terminal to the base station, is established on an air interface between the access terminal and the base station. For a voice call, in particular, a voice encoder and encoding rate may be selected by the base station (or other RAN element) for each of the forward link and the reverse link. Higher encoding rates may provide higher quality but also transmit at higher power, while lower encoding rates may provide lower quality, but also transmit at lower power. Since forward and reverse link transmissions can contribute to RF interference in a sector (and possibly neighboring sectors), RF interference in a sector will tend to increase with the number of access terminals engaging in communications (e.g., capacity loading), and with the respective transmission power levels on their respective forward and reverse links. Accordingly, selection of the voice encoder may be based, at least in part, on RF conditions and/or capacity loading conditions in the cell or sector (or other form of wireless coverage zone) in which the access terminal is operating when the voice call is set up.

More particularly, under CDMA2000 1X, codec support may be specified according to the EVRC-B standard for voice codecs. As described above EVRC-B defines eight different encoding rates, each identified according to different COP parameter value. Table 1 lists the COP parameters values (first column) and corresponding channel encoding rates (second column), source encoding rates (third column), and average data rates (fourth column). The average data rates include bits for silence intervals.

TABLE 1

| COP | Channel Rate (kbps) | Source Rate (kbps) | Average Rate (kbps) |
|---|---|---|---|
| 0 | 9.3 | 8.3 | 6.93 |
| 1 | 8.5 | 7.57 | 6.42 |
| 2 | 7.5 | 6.64 | 5.52 |
| 3 | 7.0 | 6.18 | 5.24 |
| 4 | 6.6 | 5.82 | 4.82 |
| 5 | 6.2 | 5.45 | 4.62 |
| 6 | 5.8 | 5.08 | 4.45 |
| 7 | 4.8 | 4.0 | 3.75 |

As can be seen, lower COP values correspond to higher data rates, and vice versa. Generally, COPs 0-3 specify encoding rates that yield the highest voice quality, but requires the highest transmission powers. COP 4 specifies encoding rate that yield voice quality comparable to EVRC, but requires slightly lower transmission power than EVRC, while COPs 5-7 specify encoding rates that yield the lower voice quality than EVRC, but requires even lower transmission powers.

Under EVRC-B, the base station may select one of the COP values when a voice call is set up, and instruct the access terminal to use that value on its forward and reverse links. The access terminal may then use the corresponding encoding rate on its forward and reverse links. It is also possible for the access terminal to change COP values, and corresponding coding rates, during the course of a voice call, for example as the access terminal hands off to different sectors or cells. In practice, however, a change in voice quality as COP values change can be perceived by the user as distracting and/or annoying. Consequently, a fixed COP value is typically selected for the duration of a voice call.

In conventional operation, the fixed COP value is selected by the base station of the given cell or sector in which the access terminal is operating when the call is set up, generally based on capacity utilization only in the given cell or sector. Selection in this manner can therefore fail to account for link capacity variations (and/or other operating conditions) associated with air interfaces in neighboring cells or sectors, even though the access terminal may handoff to one or more of those neighboring cells or sectors during the course of the call. As a result, resources committed to the access terminal's air interface, in correspondence with the fixed COP value, may be not accommodate the capacity variations that may be encountered in neighboring cells or sectors. Accordingly, it would be desirable to select a COP value for a call, and more generally, an encoder/decoder rate for a communication session, in such a manner that takes account of capacity and operating condition variations across the neighboring cells or sectors.

a. Example Operation

In accordance with example embodiments, a RAN device, such as a BTS or BSC, can keep track of hand-in and hand-out rates of communication sessions (e.g., voice calls) for a given sector (or cell). More particularly, the RAN device can monitor the rate of inbound handoffs into the given sector from neighboring sectors (or cells), and similarly monitor the rate of outbound handoffs from the given sector to each of the neighboring sectors. By way of example, the hand-in and hand-out rates could be determined by counting the number of hand-ins and hand-outs over successive time periods. Dividing the numbers by the time periods could give the rates for each time period. The length of the time periods could be chosen so as to achieve a given level of statistical significance for the rate determinations. Examples of time periods include 5, 10, and 15 minutes. However, other durations could be used as well. Moreover, rates determined for shorter time periods could be averaged to determine longer-term trends.

The RAN device could also keep track of COP values currently supported by the given sector and by each of the neighboring sectors. More specifically, supported COP values could be determined according operating conditions (e.g., noise, interference, and capacity loading) in the given sector and in each the neighboring sectors. The supported COP values of the given sector could be known or determined by the RAN device either directly, for example if the RAN device is the BTS of the given sector. Or the supported COP values could be determined indirectly, for example if the RAN device is a BSC that controls the BTS of the given sector. The RAN device could similarly determine the supported COP values of the neighboring sectors, or could communicate with an appropriate BSC or other controlling device if any one or more of the neighboring sectors (or cells) was not under the RAN device's control.

In accordance with example embodiments, the relative rates of hand-ins and hand-outs between the given sector and the neighboring sectors can be used as an indication of a flow of access terminals with active voice calls (or more generally, active communication sessions) into and out of the given sector. By accounting for each respective neighboring sector, the relative rates can further be used to determine a statistical indication of whether and after how long an access terminal that requests a new voice call in the given sector is likely to hand-out from the given sector, and which neighboring sectors are likely to be targets of outbound handoffs. As such, the relative rates of hand-ins and hand-outs between the given sector and the neighboring sectors can be used to statistically weight the supported COP values of the given sector and of the neighboring sectors. By so doing, the RAN device can determine a weighted average of COP values (or of associated encoding rates) that can be used to select a COP value for the request new voice call in a manner that balances RAN resources against codec-related call quality.

Figure 4:
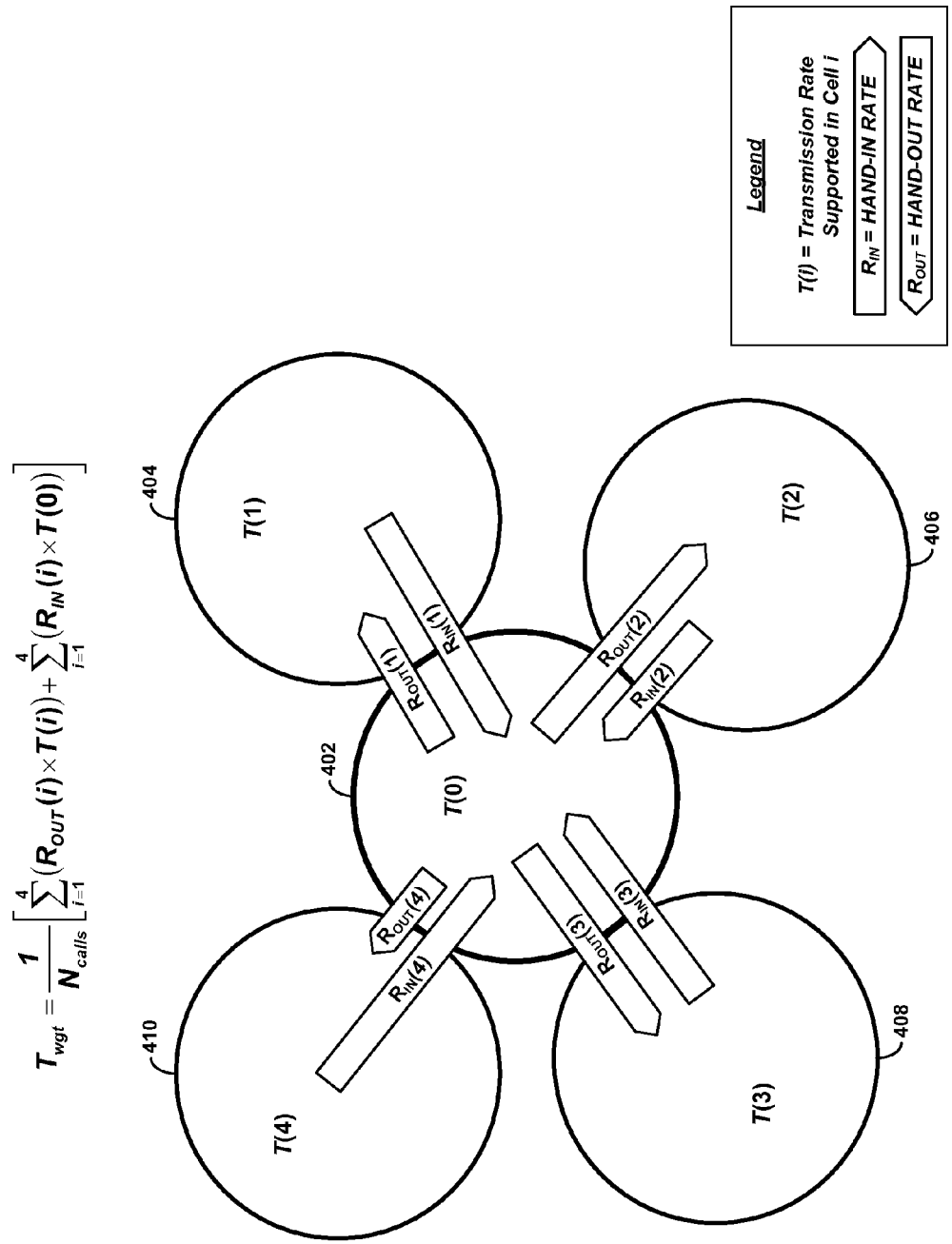
FIG. 4 illustrates an example of operation of coordination codec consistency across wireless coverage areas in a wireless communication system, in accordance with example embodiments.

FIG. 4 illustrates an example of operation of coordination codec consistency across wireless coverage areas in a wireless communication system, in accordance with example embodiments. For purposes of illustration, FIG. 4 depicts wireless coverage zones as circular cells, but the discussion applies as well to sectors or other forms of wireless coverage zones. By way of example a given cell 402 is shown in the center of the figure, with four neighboring cells 404, 406, 408, and 410 distributed around its border. The particular configuration shown is illustrative, and not intended to be limiting with respect to example embodiments. Each cell is also labeled with a supported air-interface transmission rate T(i), representing, for example, a codec encoding/decoding rate such as those listed in Table 1. Specifically, the cells 402, 404, 406, 408, and 410 support, respectively, air-interface transmission rates T(0), T(1), T(2), T(3), and T(4).

Hand-in and hand-out rates between the given cell 402 and each of the neighboring cells 404, 406, 408, and 410 are represented by broad arrows, each labeled either $R_{OUT}(i)$ for a hand-out rate from the given cell 402 to neighboring cell i, or $R_{IN}(i)$ for a hand-in rate from cell i to the given cell 402. The length of each rate arrow is meant to signify the magnitude of the associated rate; e.g., longer arrows signify higher rates, and vice versa. The particular lengths shown are illustrative, but otherwise arbitrary. A legend in the lower right hand corner of the FIG. 4 summarizes the above explanation of transmission rates and hand-in and hand-out rates.

In determining the weighted average of transmission rates, the hand-in rates are applied as weighting factors to the transmission rate T(0) of the given cell, since hand-ins result in an increased number of access terminals with active calls entering the given cell. By similar reasoning, the hand-out rates are respectively applied as weighting factors to the transmission rates T(i) of cell i, since hand-outs result in an increased number of access terminals with active calls entering cell i. As shown in FIG. 4, the weighted average of transmission rates can therefore be expressed as:

$$T_{wgt} = \frac{1}{N_{calls}} \left[ \sum_{i=1}^{4} (R_{OUT}T(i)) + \sum_{i=1}^{4} (R_{IN}T(0)) \right], \quad (1)$$

where $N_{calls}$ gives the number of access terminals with active calls in the given cell during a time interval over which the hand-in and hand-out rates is determined.

In accordance with example embodiments, the hand-in and hand-out rates in equation (1) could be expressed as encoding/decoding rates, as given in the third column of Table 1, for example. In this case, the weighted average $T_{wgt}$ would be determined in the same units. A COP parameter value for a new requested voice call in the given cell could then be selected as one that most closely corresponds to $T_{wgt}$. Alternatively, the hand-in and hand-out rates in equation (1) could be expressed directly in terms of COP parameter value, as given in the first column of Table 1, for example. In this case, the weighted average $T_{wgt}$ could be determined in terms of weighted average COP parameter value $COP_{wgt}$. A COP parameter value for a new requested voice call in the given cell could be selected as one that most closely corresponds to $COP_{wgt}$.

Selection of a COP parameter for a new call can be further illustrated by way of a numerical example and reference to Table 1. Taking example COP parameter values of 0, 2, 3, 6, and 7 as being supported in cells i, i=0, 1, 2, 3, and 4, respectively, during a time interval ΔT, the average data rates (in kbps) supported during ΔT would be 6.93, 5.52, 5.24, 4.45, and 3.75, respectively. Also by way of example (and for purely illustrative purposes), the numbers of access terminals handing in to the given cell i=0 from neighboring cells i, i=1, 2, 3, and 4 is taken to be 10, 2, 3, 5, and 4, respectively, during a time interval ΔT. The example numbers of access terminals handing out from the given cell i=0 to neighboring cells i, i=1, 2, 3, and 4 is taken to be 5, 7, 9, and 15, respectively, during a time interval ΔT. The total number of active calls $N_{calls}$ handing in or out during ΔT is therefore 58.

Applying equation (1) to the example rates and numbers gives $T_{wgt}$=5.39, which falls between 5.52 kbps (COP=2) and 5.24 kbps (COP=3) in Table 1. More specifically, the average of the two tabulated data rates is 5.38. Thus in this example $T_{wgt}$ is just slightly larger than the average. In this case the RAN device could select COP=2 for a new call. However, since $T_{wgt}$ is so close to the midway point between 5.52 kbps and 5.24 kbps, selection of COP=3 could also be valid. The choice could depend on other factors and/or criteria. For example, a cutoff threshold different from the midway point could be used for selecting a high data rate (and low COP value). Applying equation (1) instead to the COP parameter values of the above example gives $COP_{wgt}$=3.27. Based on this weighed average, the RAN device could select COP=3 for a new call.

It will be appreciated that the numerical example above is illustrative, and other values could yield different results. Also, since COP values serve as numeric (symbolic) labels of encoding rates, the example alternative approaches of determining $T_{wgt}$ or $COP_{wgt}$ may not necessarily yield identical results for COP selection in every instance. In addition, the example of a given cell and four neighboring cells shown in FIG. 4 is also illustrative. Actual cell and sector deployments could differ from the example depicted in FIG. 4. Moreover, the example operation and method could be extended to a larger or small number of cells or sectors, and could also be extended to cover cells or sectors that do not directly neighbor the given cell or sector.

In accordance with example embodiments, selection of a COP parameter for a new call in a given sector could also be determined on a pair-wise basis between the given cell and a single neighboring cell. In this case, hand-in and hand-out rates between the two cells could be implemented as simple table of percentages. For example, taking "cell A" as the given cell in which a new voice call is requested, and "cell B" as the neighboring cell, a COP value for the new call could be selected based on percentage rates of hand-in and hand-outs between cells A and B. If hand-outs to cell B exceed X % of new calls, then the RAN device could select a new COP value according to the COP value supported by cell B. If hand-out rates to cell be are between Y % and X % (for Y<X), then the RAN device could select a COP value based on an average of the COP values supported in cells A and B. If hand-out rates are less than Y %, or if hand-in rates to cell A exceed hand-out rates to cell B, then the RAN device could select a new COP value according to the COP value supported by cell A. As a numerical example, X could be 75 and Y could be 50. Other values could be used as well.

In further accordance with example embodiments, the RAN device could make a determination of $T_{wgt}$ (or $COP_{wgt}$) for each new call request it receives from an access terminal in the given cell or sector. Alternatively, the RAN device could continually monitor hand-in and hand-out rates, and update $T_{wgt}$ (or $COP_{wgt}$) accordingly. The most recent update could be applied in any given instance of COP selection.

Also in accordance with example embodiments, the method of determining the weighted averages described above could be implemented by translating one or more algorithms for equation (1) and other determination and/or selection steps and tables into machine language instructions stored in memory of the RAN device, and executable by one or more processors of the RAN device. In addition, the machine language instructions could be stored on one or another form of non-transitory computer readable medium, such a DVD or CD-ROM, for example. The stored instructions could be accessed by one or more processors for execution, or transferred from the non-transitory computer readable medium into memory accessible by one or more processors.

b. Example RAN Device

Figure 5:
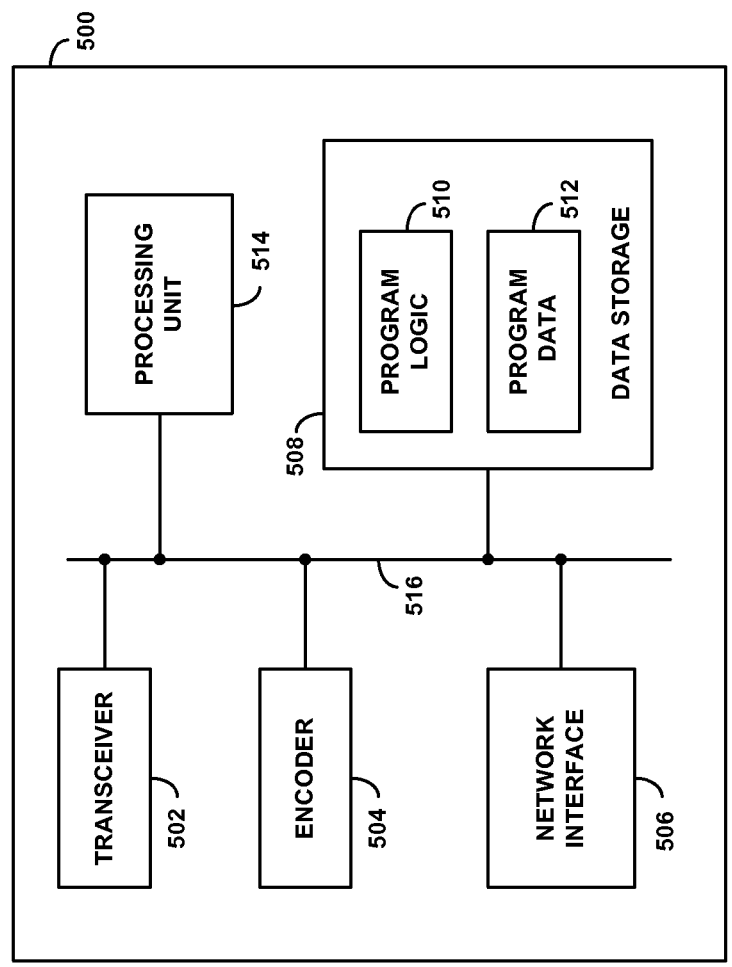
FIG. 5 is a block diagram of an example RAN device in which an example method of coordination codec consistency across wireless coverage areas could be implemented.

The example embodiments of coordination codec consistency across wireless coverage areas described above can be implemented as methods in a RAN device, such as a BSC, RNC, base station, or MSC, for example. The discussion above of FIG. 1 provides an example of such a method. FIG. 5 is a block diagram depicting functional components of an example RAN device in which an example method of coordination codec consistency across wireless coverage areas could be implemented. As shown in FIG. 5, the RAN device 500, representative of BSC 206-1 or 206-2, or BSC 206-1 integrated with BTS 204-1 or BSC 206-2 integrated with BTS 204-2, in FIG. 2, for instance, includes a transceiver 502, a encoder 504, network interface 506, a processing unit 514, and data storage 508, all of which may be coupled together by a system bus 516 or other mechanism. In addition, the RAN device may also include external storage, such as magnetic or optical disk storage, although this is not shown in FIG. 5.

These components may be arranged to support conventional operation in a wireless communication network that is compliant with a CDMA family of protocols, such as network 200 illustrated in FIG. 2. The details of such an arrangement and how these components function to provide conventional operation are well-known in the art, and are not described further herein.

Network interface 506 enables communication on a network, such network 200. As such, network interface 506 may take the form of trunk or optical link that can be coupled with one or more other a TDM switches (e.g., other MSCs or trunk switches) such as MSC 208-1 or 208-2. The network interface 506 could also take the form of an Ethernet network interface card or other physical connection, among other possibilities, for connection to a packet device, such as PCF 214, for instance. Further, network interface 506 in combination with encoder 504 and transceiver 502, which may include one or more BTS antennas, enables air interface communication with one or more access terminals on air-interface forward and reverse links, thereby supporting methods of coordination codec consistency across wireless coverage areas described herein.

Processing unit 514 comprises one or more general-purpose processors (e.g., INTEL microprocessors) and/or one or more special-purpose processors (e.g., dedicated digital signal processor, application specific integrated circuit, etc.). In turn, the data storage 508 comprises one or more volatile and/or non-volatile storage components, such as magnetic or optical memory or disk storage. Data storage 508 can be integrated in whole or in part with processing unit 514, as cache memory or registers for instance. As further shown, data storage 508 is equipped to hold program logic 510 and program data 512.

Program logic 510 may comprise machine language instructions that define routines executable by processing unit 514 to carry out various functions described herein. In particular the program logic, communication interface, and encoder may operate cooperatively to carry out logical operation such as that discussed above. Further, program data 512 may be arranged to store data used in conjunction with the logical operations described above.

It will be appreciated that there can be numerous specific implementations of a network switch, such as RAN device 500, in which a method of coordination codec consistency across wireless coverage areas could be implemented. Further, one of skill in the art would understand how to devise and build such an implementation. As such, RAN device 500 is representative of means for carrying out coordination codec consistency across wireless coverage areas, in accordance with the functions and steps described herein by way of example.

5. CONCLUSION

An exemplary embodiment of the present invention has been described above. Those skilled in the art will understand, however, that changes and modifications may be made to this embodiment without departing from the true scope and spirit of the invention, which is defined by the claims.

I claim:

1. In a radio access network (RAN) device of a wireless communication system, a method comprising:
    determining a rate of inbound handoffs of active communication sessions to a given wireless coverage zone from each of one or more neighboring wireless coverage zones, wherein the active communication sessions are carried for respective time intervals on one or more air interface between respective access terminals and at least the given wireless coverage zone;
    determining a respective rate of outbound handoffs of active communication sessions from the given wireless coverage zone to each of the one or more neighboring wireless coverage zones;
    based on the determined rate of inbound handoffs and on the determined respective rates of outbound handoffs, determining a weighted average of transmission rates supported by an air interface of the given wireless coverage zone and respective air interfaces of the one or more neighboring wireless coverage zones;
    upon receiving a request from an access terminal to set up a new communication session via the air interface of the given wireless coverage zone, determining a coding rate for the new communication session based on the determined weighted average of transmission rates; and
    transmitting an instruction to the access terminal to use the determined coding rate for air-interface communications for a duration of the new communication session.

2. The method of claim 1, wherein determining the weighted average of transmission rates supported by the air interface of the given wireless coverage zone and the respective air interfaces of the one or more neighboring wireless coverage zones comprises:
    weighting a transmission rate supported by the air interface of the given wireless coverage zone by the determined rate of inbound handoffs; and
    weighting a transmission rate supported by an air interface of each respective neighboring wireless coverage zone of the one or more neighboring wireless coverage zones by the respective rate of outbound handoffs to the respective neighboring wireless coverage zone.

3. The method of claim 1, wherein determining the weighted average of transmission rates supported by the air interface of the given wireless coverage zone and the respective air interfaces of the one or more neighboring wireless coverage zones comprises:
    determining a transmission rate supported by the air interface of the given wireless coverage zone based on a quality level of radio-frequency (RF) operating conditions in the given wireless coverage zone; and
    determining a transmission rate supported by an air interface of each respective neighboring wireless coverage zone of the one or more neighboring wireless coverage zones based on a quality level of RF operating conditions in the respective neighboring wireless coverage zone.

4. The method of claim 1, wherein determining the weighted average of transmission rates supported by the air interface of the given wireless coverage zone and the respective air interfaces of the one or more neighboring wireless coverage zones comprises determining a weighted average of forward-link transmission rates supported on air-interface forward links from the given wireless coverage zone and from the one or more neighboring wireless coverage zones to access terminals,
    wherein determining the coding rate for the new communication session comprises selecting a decoding rate for forward-link communications based on the determined weighted average of forward-link transmission rates,
    and wherein transmitting the instruction to the access terminal to use the determined coding rate for air-interface communications for the duration of the new communication session comprises transmitting an instruction to the access terminal to use the selected decoding rate for forward-link communications.

5. The method of claim 1, wherein determining the weighted average of transmission rates supported by the air interface of the given wireless coverage zone and the respective air interfaces of the one or more neighboring wireless coverage zones comprises determining a weighted average of reverse-link transmission rates supported on air-interface reverse links to the given wireless coverage zone and to the one or more neighboring wireless coverage zones from access terminals,
    wherein determining the coding rate for the new communication session comprises selecting an encoding rate for reverse-link communications based on the determined weighted average of reverse-link transmission rates,
    and wherein transmitting the instruction to the access terminal to use the determined coding rate for air-interface communications for the duration of the new communication session comprises transmitting an instruction to the access terminal to use the selected encoding rate for reverse-link communications.

6. The method of claim 1, wherein the new communication session is a voice call,
    and wherein determining the coding rate for the new communication session based on the determined weighted average of transmission rates comprises determining a voice codec and encoding rate that will be used on at least the air interface of the given wireless coverage zone during the voice call.

7. The method of claim 1, wherein transmission rates supported by the air interface of the given wireless coverage zone and by respective air interfaces of the one or more neighboring wireless coverage zones correspond to coding rates supported by the air interface of the given wireless coverage zone and by respective air interfaces of the one or more neighboring wireless coverage zones,
    and wherein determining the weighted average of transmission rates supported by the air interface of the given wireless coverage zone and the respective air interfaces of the one or more neighboring wireless coverage zones comprises determining a weighted average of coding rates supported by the air interface of the given wireless coverage zone and the respective air interfaces of the one or more neighboring wireless coverage zones.

8. The method of claim 7, wherein the coding rates supported by the air interface of the given wireless coverage zone and by respective air interfaces of the one or more neighboring wireless coverage zones are each identified according to a symbolic label, and wherein determining the weighted average of the coding rates supported by the air interface of the given wireless coverage zone and the respective air interfaces of the one or more neighboring wireless coverage zones comprises determining a weighted average of symbolic labels.

9. The method of claim 1, wherein determining the coding rate for the new communication session based on the determined weighted average of transmission rates comprises selecting from among a plurality of predefined coding rates a particular coding rate that most closely corresponds to the determined weighted average of transmission rates.

10. The method of claim 9, wherein the new communication session is a voice call, wherein the RAN device is one of a base station, a base transceiver station, a base station controller, or a radio network controller, wherein the wireless communication system is configured to operate according to at least EVRC-B, including assignment of air-interface coding rates according to predefined Capacity Operating Point (COP) parameter values ranging from a minimum COPs value to a maximum COPs value, wherein the given wireless coverage zone is a particular wireless sector of the wireless communication system, wherein each of the one or more neighboring wireless coverage zones is a respective wireless sector of the wireless communication network, and wherein selecting from among the plurality of predefined coding rates the particular coding rate that most closely corresponds to the determined weighted average of transmission rates comprises selecting a COP parameter value associated with an air-interface coding that most closely corresponds to the determined weighted average of transmission rates.

11. A radio access network (RAN) device of a wireless communication system comprising:

one or more processors;

memory accessible by the one or more processors; and computer-readable instructions stored in the memory that upon execution by the one or more processors cause the RAN device to carry out functions including:

determining a rate of inbound handoffs of active communication sessions to a given wireless coverage zone from each of one or more neighboring wireless coverage zones, wherein the active communication sessions are carried for respective time intervals on one or more air interface between respective access terminals and at least the given wireless coverage zone, determining a respective rate of outbound handoffs of active communication sessions from the given wireless coverage zone to each of the one or more neighboring wireless coverage zones;

based on the determined rate of inbound handoffs and on the determined respective rates of outbound handoffs, determining a weighted average of transmission rates supported by an air interface of the given wireless coverage zone and respective air interfaces of the one or more neighboring wireless coverage zones, upon receiving a request from an access terminal to set up a new communication session via the air interface of the given wireless coverage zone, determining a coding rate for the new communication session based on the determined weighted average of transmission rates, and transmitting an instruction to the access terminal to use the determined coding rate for air-interface communications for a duration of the new communication session.

12. The RAN device of claim 11, wherein determining the weighted average of transmission rates supported by the air interface of the given wireless coverage zone and the respective air interfaces of the one or more neighboring wireless coverage zones comprises:

determining a transmission rate supported by the air interface of the given wireless coverage zone based on a quality level of radio-frequency (RF) operating conditions in the given wireless coverage zone; and determining a transmission rate supported by an air interface of each respective neighboring wireless coverage zone of the one or more neighboring wireless coverage zones based on a quality level of RF operating conditions in the respective neighboring wireless coverage zone.

13. The RAN device of claim 11, wherein determining the weighted average of transmission rates supported by the air interface of the given wireless coverage zone and the respective air interfaces of the one or more neighboring wireless coverage zones comprises determining at least one of (i) a weighted average of forward-link transmission rates supported on air-interface forward links from the given wireless coverage zone and from the one or more neighboring wireless coverage zones to access terminals, or (ii) a weighted average of reverse-link transmission rates supported on air-interface reverse links to the given wireless coverage zone and to the one or more neighboring wireless coverage zones from access terminals, wherein determining the coding rate for the new communication session comprises selecting at least one of (i) a decoding rate for forward-link communications based on the determined weighted average of forward-link transmission rates, or (ii) an encoding rate for reverse-link communications based on the determined weighted average of reverse-link transmission rates, and wherein transmitting the instruction to the access terminal to use the determined coding rate for air-interface communications for the duration of the new communication session comprises transmitting at least one of (i) an instruction to the access terminal to use the selected decoding rate for forward-link communications, or (ii) an instruction to the access terminal to use the selected encoding rate for reverse-link communications.

14. The RAN device of claim 11, wherein transmission rates supported by the air interface of the given wireless coverage zone and by respective air interfaces of the one or more neighboring wireless coverage zones correspond to coding rates supported by the air interface of the given wireless coverage zone and by respective air interfaces of the one or more neighboring wireless coverage zones, wherein determining the weighted average of transmission rates supported by the air interface of the given wireless coverage zone and the respective air interfaces of the one or more neighboring wireless coverage zones comprises determining a weighted average of coding rates supported by the air interface of the given wireless coverage zone and the respective air interfaces of the one or more neighboring wireless coverage zones, wherein the coding rates supported by the air interface of the given wireless coverage zone and by respective air interfaces of the one or more neighboring wireless coverage zones are each identified according to a symbolic label, and wherein determining the weighted average of the coding rates supported by the air interface of the given wireless coverage zone and the respective air interfaces of the one or more neighboring wireless coverage zones comprises determining a weighted average of symbolic labels.

15. The RAN device of claim 11, wherein the new communication session is a voice call,
wherein the RAN device is one of a base station, a base transceiver station, a base station controller, or a radio network controller,
wherein the wireless communication system is configured to operate according to at least EVRC-B, including assignment of air-interface coding rates according to predefined Capacity Operating Point (COP) parameter values ranging from a minimum COPs value to a maximum COPs value,
wherein the given wireless coverage zone is a particular wireless sector of the wireless communication system,
wherein each of the one or more neighboring wireless coverage zones is a respective wireless sector of the wireless communication network,
wherein determining the coding rate for the new communication session based on the determined weighted average of transmission rates comprises selecting a COP parameter value associated with an air-interface coding that most closely corresponds to the determined weighted average of transmission rates.

16. A non-transitory computer-readable medium having instructions stored thereon that, upon execution by one or more processors of a radio access network (RAN) device of a wireless communication network, cause the RAN device to carry out functions including:
determining a rate of inbound handoffs of active communication sessions to a given wireless coverage zone from each of one or more neighboring wireless coverage zones, wherein the active communication sessions are carried for respective time intervals on one or more air interface between respective access terminals and at least the given wireless coverage zone;
determining a respective rate of outbound handoffs of active communication sessions from the given wireless coverage zone to each of the one or more neighboring wireless coverage zones;
based on the determined rate of inbound handoffs and on the determined respective rates of outbound handoffs, determining a weighted average of transmission rates supported by an air interface of the given wireless coverage zone and respective air interfaces of the one or more neighboring wireless coverage zones;
upon receiving a request from an access terminal to set up a new communication session via the air interface of the given wireless coverage zone, determining a coding rate for the new communication session based on the determined weighted average of transmission rates; and
transmitting an instruction to the access terminal to use the determined coding rate for air-interface communications for a duration of the new communication session.

17. The non-transitory computer-readable medium of claim 16, wherein determining the weighted average of transmission rates supported by the air interface of the given wireless coverage zone and the respective air interfaces of the one or more neighboring wireless coverage zones comprises:
weighting a transmission rate supported by the air interface of the given wireless coverage zone by the determined rate of inbound handoffs; and
weighting a transmission rate supported by an air interface of each respective neighboring wireless coverage zone of the one or more neighboring wireless coverage zones by the respective rate of outbound handoffs to the respective neighboring wireless coverage zone.

18. The non-transitory computer-readable medium of claim 16, wherein determining the weighted average of transmission rates supported by the air interface of the given wireless coverage zone and the respective air interfaces of the one or more neighboring wireless coverage zones comprises determining at least one of (i) a weighted average of forward-link transmission rates supported on air-interface forward links from the given wireless coverage zone and from the one or more neighboring wireless coverage zones to access terminals, or (ii) a weighted average of reverse-link transmission rates supported on air-interface reverse links to the given wireless coverage zone and to the one or more neighboring wireless coverage zones from access terminals,
wherein determining the coding rate for the new communication session comprises selecting at least one of (i) a decoding rate for forward-link communications based on the determined weighted average of forward-link transmission rates, or (ii) an encoding rate for reverse-link communications based on the determined weighted average of reverse-link transmission rates,
and wherein transmitting the instruction to the access terminal to use the determined coding rate for air-interface communications for the duration of the new communication session comprises transmitting at least one of (i) an instruction to the access terminal to use the selected decoding rate for forward-link communications, or (ii) an instruction to the access terminal to use the selected encoding rate for reverse-link communications.

19. The non-transitory computer-readable medium of claim 16, wherein transmission rates supported by the air interface of the given wireless coverage zone and by respective air interfaces of the one or more neighboring wireless coverage zones correspond to coding rates supported by the air interface of the given wireless coverage zone and by respective air interfaces of the one or more neighboring wireless coverage zones,
wherein determining the weighted average of transmission rates supported by the air interface of the given wireless coverage zone and the respective air interfaces of the one or more neighboring wireless coverage zones comprises determining a weighted average of coding rates supported by the air interface of the given wireless coverage zone and the respective air interfaces of the one or more neighboring wireless coverage zones,
and wherein determining the coding rate for the new communication session based on the determined weighted average of transmission rates comprises selecting from among a plurality of predefined coding rates a particular coding rate that most closely corresponds to the determined weighted average of coding rates.

20. The non-transitory computer-readable medium of claim 16, wherein the new communication session is a voice call,
wherein the RAN device is one of a base station, a base transceiver station, a base station controller, or a radio network controller, wherein the wireless communication system is configured to operate according to at least EVRC-B, including assignment of air-interface coding rates according to predefined Capacity Operating Point (COP) parameter values ranging from a minimum COPs value to a maximum COPs value, wherein the given wireless coverage zone is a particular wireless sector of the wireless communication system, wherein each of the one or more neighboring wireless coverage zones is a respective wireless sector of the wireless communication network, and wherein determining the coding rate for the new communication session based on the determined weighted average of transmission rates comprises selecting a COP parameter value associated with an air-interface coding that most closely corresponds to the determined weighted average of transmission rates.

\* \* \* \* \*